J. B. DAVIS.
DISPENSING PUMP.
APPLICATION FILED SEPT. 27, 1920.
1,430,953.
Patented Oct. 3, 1922.
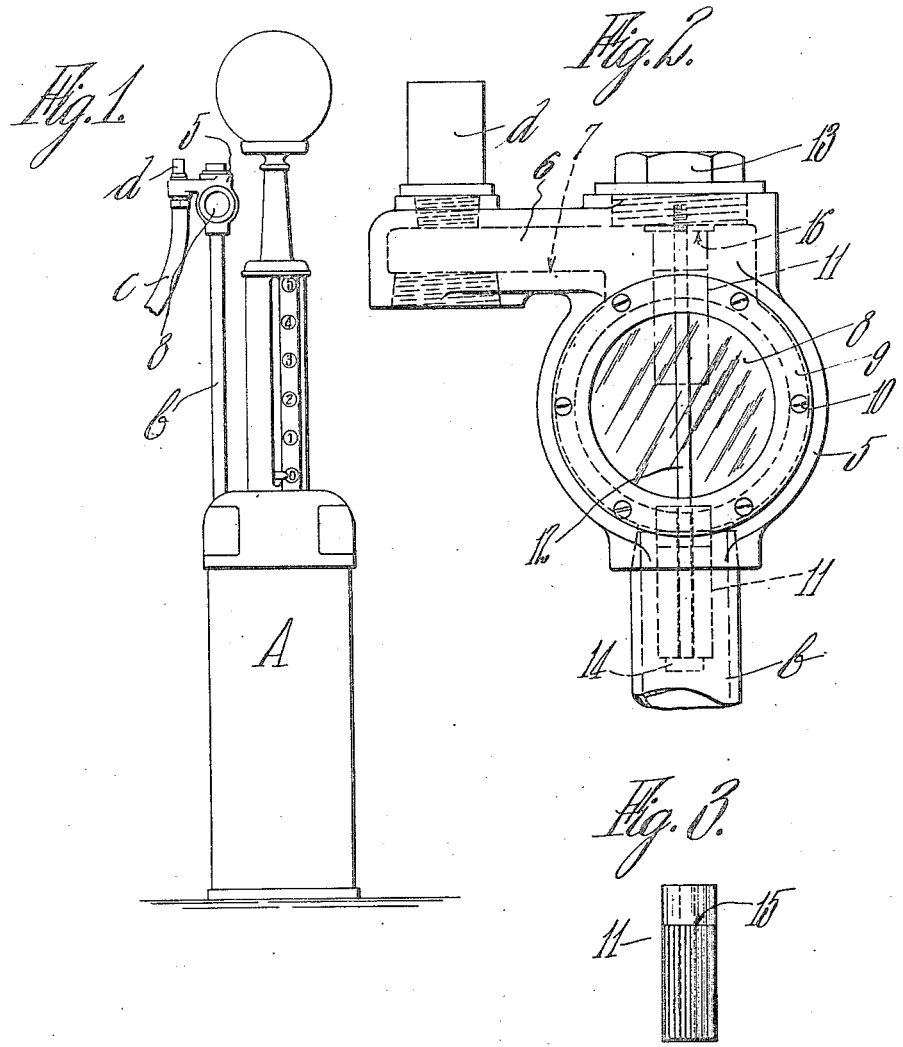
INVENTOR
John B. Davis.
BY
Chapin & Neal
ATTORNEYS.

Patented Oct. 3, 1922.

1,430,953

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

DISPENSING PUMP.

Application filed September 27, 1920. Serial No. 412,947.

*To all whom it may concern:*

Be it known that I, JOHN B. DAVIS, a citizen of the United States, residing at Springfield, in the county of Hampden and State of Massachusetts, have invented new and useful Improvements in Dispensing Pumps, of which the following is a specification.

This invention relates generally to measuring pumps, such as are commonly used for dispensing gasoline and like oils, and, more particularly, to improvements in pumps of this type designed to prevent deception of the customer by failure to deliver the exact quantity apparently measured.

The source of difficulty which this invention seeks to overcome is failure to "prime" the pump prior to a measuring and dispensing operation. That is, unless the pump cylinder (above the level of the piston) and its discharge passage are filled with fluid prior to pumping, a full stroke of the pump will not deliver the full capacity thereof to the purchaser. The full quantity will be pumped, but some part of it will remain in the cylinder or discharge passage to fill the spaces theretofore unfilled.

It frequently happens that a measuring pump is not fully "primed" although theoretically it should be. This is due to leakage,—generally leakage around the piston. Leakage, to a degree so small as not to appreciably affect the accuracy of the pump when frequently operated, will after relatively long intervals result in appreciable quantities of fluid draining past the piston. Thus, after a pump has been idle over night, it is customary to operate the pump until it is completely primed prior to dispensing the fluid to customers.

This invention has for its object the provision of means whereby the customer may readily ascertain whether or not the pump is fully primed.

More particularly, it is an object of the invention to provide a transparent section at the uppermost portion of the discharge passage of the pump, whereby the customer may see whether or not such passage is filled to the proper level.

Other objects and advantages will appear in the following description and in the illustrative embodiment of the invention in the accompanying drawings, in which:

Fig. 1 is an elevational view of a measuring and dispensing pump embodying the invention;

Fig. 2 is an enlarged fragmentary view illustrative of the transparent section in the discharge pipe of the pump; and Fig. 3 is an elevational view of an indicating device, which, by preference, is provided within the discharge pipe to give better indications through the transparent section than would otherwise be had.

Referring to these drawings; A represents generally a measuring and dispensing pump and $b$ its discharge passage. The pump may be of any desired type and that shown is merely for illustrative purposes. For an understanding of the present invention detailed description of the pump is unnecessary, but a full disclosure of the type of pump illustrated may be had, if desired, by reference to my U. S. Letters Patent No. 1,302,014, granted April 29, 1919. The discharge passage $b$, as illustrated, takes the form of a pipe which extends upwardly above the top of the pump cylinder for a substantial distance, and this arrangement is generally desired, although not necessarily essential for all purposes. To the upper end of discharge passage $b$ is attached a flexible delivery hose $c$, and there is provided an air-vent valve, conventionally indicated at $d$, which automatically opens when pumping ceases to admit air into the upper end of the hose $c$ and permit it to drain. This valve $d$ is too well known in the art to require description here, but for a complete disclosure reference is made to my U. S. Letters Patent No. 1,345,837, granted July 6, 1920.

For convenience in applying the indicating device of this invention to the discharge passage $b$, I provide a casing 5, which may be screwed on, or otherwise affixed to, the upper end of pipe $b$. Casing 5 is provided with an elbow portion 6 to which are secured the air-vent valve $d$ and hose $c$, the casing being hollow to afford communication between these elements and pipe $b$.

It will be apparent that, unless the passage $b$ is filled to the level of the surface 7 of the casing 5, the full quantity pumped will not be delivered through hose $e$, for some liquid will remain to fill the formerly unfilled parts of the pipe $b$ and casing 5 to the level of the surface 7. When the pipe *b* and its extension (the casing 5) are filled to a level with the surface 7, the pump is said to be primed.

To ascertain whether or not the pump is primed, at least one transparent section is provided in the discharge passage, as indicated at 8. As shown, this section consists of a circular glass 8 set into a cylindrical enlargement of the casing 5 and held thereto by a ring 9 and screws 10, suitable gaskets, or their equivalent, being provided to prevent leakage. Preferably, there are two transparent sections 8, one at each end of the cylindrical portion of casing 5.

While indications, as to whether or not the pump is primed, can be had by reason of the transparent sections 9, I prefer to provide another device in conjunction therewith, to give better indications. This device consists of a float 11 which, when the pump is not primed, lies below the glass 8. As the liquid rises in passage *b* and casing 5, float 11 rises and becomes visible through the glass. When the float ceases to rise, the customer knows that the pump has been fully primed.

Float 11 may be advantageously supported and guided in the following manner. A rod 12 suitably affixed to the upper end of casing 5, or, by preference, to a removable plug 13 therein, extends downwardly through the casing and, if necessary, into pipe *b*. Float 11 encompasses rod 12 and is freely slidable thereon, being prevented from dropping off the lower end of the rod by a collar or flange 14 fixed thereon.

The float preferably has a line 15 thereon, which indicates its depth of submergence in the liquid and therefore the level of the liquid. When float 11 rises sufficiently to bring line 15 to a level with surface 7, a stop is provided to prevent further upward movement of the float. As illustrated, this stop consists of the lower surface 16 of the removable plug 13. The float may likewise be painted in contrasting colors, as, for example, red below line 15 and white above. As long as the white portion of float 11 is visible through glass 8, the purchaser knows that the pump is not primed.

So far as the present invention is concerned, it is not at all essential that pipe *b* extend upwardly any appreciable distance above the top of the pump cylinder. The essential thing is to locate the transparent section and indicating device at or near the highest point in the discharge passage, irrespective of its length. The discharge passage does not necessarily need to be a separate pipe as shown, but may be formed in the pump cylinder proper.

This invention is particularly suitable for the so-called "blind" pumps, as distinguished from the visible pumps which are now frequently demanded by the trade. It renders such pumps free from one of the main objections which have heretofore been urged against pumps of this type.

The invention has been disclosed herein, in an embodiment at present preferred, for illustrative purposes, but the scope of the invention is defined by the appended claim rather than by the foregoing description.

What I claim is:

An indicator for dispensing pumps, comprising, a casing having an elbow-shaped passage one end of which is adapted for connection to the discharge passage of the pump and the other end of which constitutes an outlet, an air-vent valve provided for the outlet arm of the passage, a transparent section in the wall of the other arm of said passage, a removable portion in the casing overlying said last-named arm of the passage, a guide-rod depending from said portion in said last-named arm of the passage, a float slidable on said rod, and means for limiting the extent of sliding movement of the float on said rod.

JOHN B. DAVIS.